INVENTOR.
RALPH H. OSTERGREN

Aug. 23, 1960

R. H. OSTERGREN 2,949,672

STATIONARY FIELD SCANNING SYSTEM

Filed Feb. 18, 1952

*INVENTOR.*
RALPH H. OSTERGREN

BY William R. Lane

ATTORNEY

United States Patent Office 2,949,672
Patented Aug. 23, 1960

2,949,672

STATIONARY FIELD SCANNING SYSTEM

Ralph H. Ostergren, Fullerton, Calif., assignor to North American Aviation, Inc.

Filed Feb. 18, 1952, Ser. No. 272,074

5 Claims. (Cl. 33—1)

This invention relates to scanning devices, and particularly to means for measuring the magnitude and direction of the deviation of the line of sight to a source of radiant energy or to a point representing the absence of radiant energy from the optical axis of an optical system.

Various scanning devices proposed in the past have suffered from the difficulty of distinguishing between background light, or radiant energy, and radiant energy from the source to be detected. This invention contemplates a device for scanning the field in which the source of radiant energy is situated with a series of consecutive radial scans so that the radiant energy responsive means needs distinguish only between the radiant energy received from the radiant energy source and the radiant energy received from a point in the background in which the source is located.

It is therefore an object of this invention to provide a scanning system for scanning an optical field with successive radial paths of different orientation.

It is another object of this invention to provide means for measuring the angular misorientation between the line of sight to a source of radiant energy, or to a point from which radiant energy is absent, from an axis in space.

It is another object of this invention to provide means for measuring the magnitude of the angular deviation between the line of sight to a source of radiant energy and a line in space.

It is another object of this invention to provide means for simultaneously measuring the magnitude and direction of the angular deviation between the line of sight to a point of radiant energy discontinuity such as a source of radiant energy or a point from which no radiation occurs from an axis in space.

Other objects of invention will become apparent from the following description taken in connection with the accompanying drawings, in which—

Figure 1:
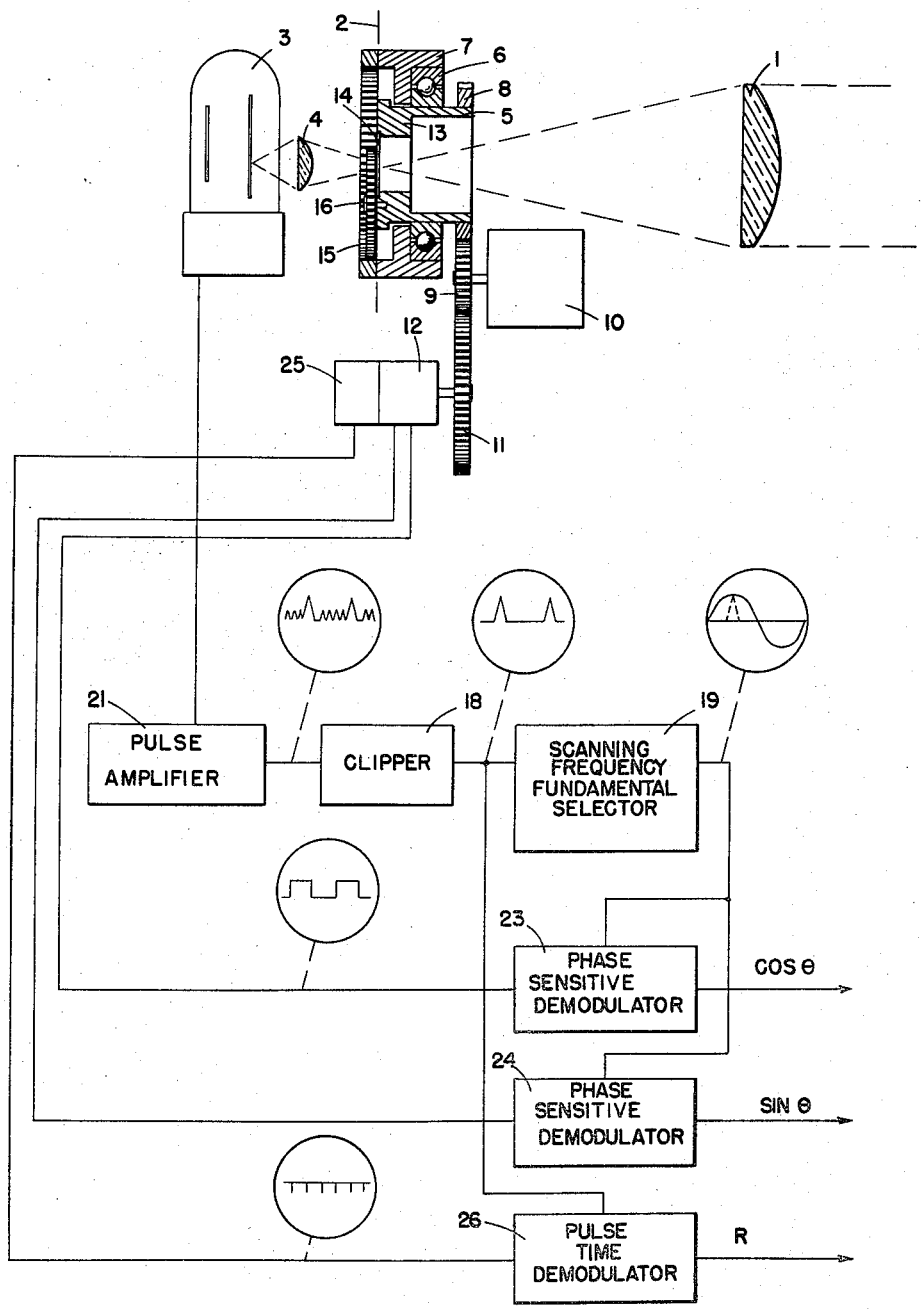
Fig. 1 is a block diagram of the invention.
Figure 2:
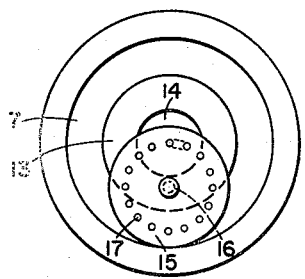
Fig. 2 is an elevational view of a part of the device shown in Fig. 1.
Figure 3:
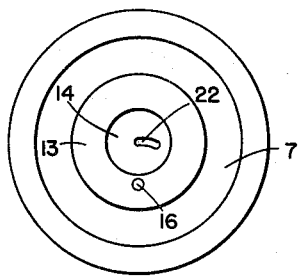
Fig. 3 is a partial elevational view of the device shown in Fig. 1 showing the rotatable diaphragm of the invention.

Referring first to Fig. 1, there is shown an objective lens 1 for gathering light from a source of radiant energy and focusing it on a focal plane 2. After passing through focal plane 2, light is imaged upon the cathode of a photomultiplier tube 3 by a lens 4. Scanning is accomplished by means of a hollow shaft rotor 5 supported in bearings 6 on a frame 7. Integrally attached to shaft 5 is a gear 8 geared to a motor 10 by gear 9. Gear 9 also drives gear 11 which in turn drives a chopper 12. A diaphragm plate 14 is attached to shaft 5 and has cut in it a short radial slot 22 extending from the center of the diaphragm to a position radially outward therefrom. Abutting the diaphragm plate is a thin, opaque disc 15 mounted for rotation on a stub shaft 16 fixed to collar 13 of shaft 5. A series of aperture holes 17 are arranged in a circle and equally spaced thereabout so that the distance between two adjacent aperture holes equals the length of the slot in the diaphragm plate and only one hole covers the slot at any one time. Disc 15 is caused to rotate by contact with the internal cylindrical surface of frame 7. Disc 15 and diaphragm plate 14 are caused to rotate in synchronism so that the instantaneous direction of travel of any one of apertures 17 at the time it passes the axis of rotation of diaphragm 14 is in the direction of the length of slot 22. Signals from commutator 12 and photomultiplier tube 3 are fed to an interpretive system which produces signals indicative of the magnitude and direction of deviation of a line of sight to a source of radiant energy being detected from the optical axis of lens 1. Signals from the photomultiplier tube are fed to pulse amplifier 21 and thence to clipper 18 which produces a signal which if viewed with an oscilloscope would appear as a series of pips on a horizontal time base. The output of clipper 18 is fed to scan frequency fundamental selector 19 which produces a sine wave centered in time about each of the pips produced by clipper 18. Selector 19 may be merely a selective amplifier tuned to a fundamental frequency equal to the rotative rate of diaphragm 14. Simultaneously, commutator 12 produces two signals 90 degrees out of phase, which are fed to phase sensitive demodulators 23 and 24 to each of which is also fed the output of scan frequency fundamental selector 19. The outputs of phase sensitive demodulators 24 and 23 are signals proportional to the sine and cosine, respectively, of the angle $\theta$ defined in Fig. 4. These demodulators as well as demodulator 26 are of a type well known in the art and are illustrated and explained in chapter 14 of volume 19 of the Radiation Laboratory Series entitled "Waveforms" by Chance, Hughes, MacNichol, Sayre and Williams.

Figure 5:
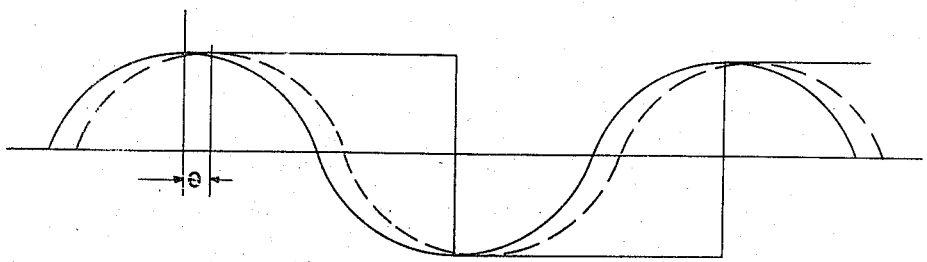
Fig. 5 is a graph of the electrical output of a component of the invention.

The form of the inputs to the demodulators is illustrated by the graph of Fig. 5. The output of a demodulator approximates the integral of that portion of the input thereto which is embraced by the positive portion of the square wave signal from the commutator. The outputs of the demodulators may therefore be shown to be proportional to the sine and cosine functions of the angle $\theta$ defined in Fig. 4. From Fig. 5 it can be seen that when the maximum of the sine wave from selector 19 coincides with the leading edge of the positive-going portion of the square wave, the above integral is zero. This wave is shown by a solid line in Fig. 5. But when the star is displaced from the reference axis in Fig. 4 by an angle $\theta$, the demodulator receives a signal represented by the dotted plot in Fig. 5, and the integral of this function over the positive portion of the square wave is proportional to the sine of the angle $\theta$. If the square wave inputs to the two demodulators differ by 90 degrees in phase, the output of one demodulator is proportional to $\sin \theta$, and the other to $\cos \theta$.

Figure 4:
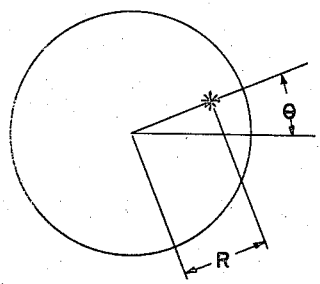
Fig. 4 is a diagram illustrating the coordinates of a radiant energy source in the field of view of the invention.

To measure the distance R defined in Fig. 4, which represents the radial coordinate of the source of radiant energy in the field, there is provided a commutator 25 also driven by motor 10, which generates a sharp pulse each time a scan begins. The oscilloscope presentation of this signal is shown in Fig. 1 and may be achieved by a variety of devices well known in the art. This signal is fed to pulse time demodulator 26, as is a portion of the signal from clipper 18. This demodulator measures the time between the reference pulse from commutator 25 and the pulse from clipper 18. The output of pulse time demodulator 26 is then a measure of the radial coordinate of the star, or other source of radiant energy, in the field of view of the telescope.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for measuring the magnitude and direction of deviation of the line of sight to a star from a line in space, comprising a rotatable opaque diaphragm slotted radially from its center, an optical system for gathering light from a star and casting it on said diaphragm, means for rotating said diaphragm about the optical axis of said system, a rotatable opaque disc having a plurality of perforations uniformly spaced in a circle on said disc, means for rotating said disc adjacent said diaphragm about an axis parallel to but displaced by the radius of said circle from said optical axis, means for generating a signal synchronously with the rotation of said diaphragm, photoelectric means for generating a signal from light passing through said diaphragm and said disc, and means for measuring the time interval between the signal from said photoelectric cell and said generating means and the time phase between said signal from said photoelectric cell and said synchronous generating means to thereby measure the magnitude and direction of deviation of the line of sight to said star from the optical axis of said system.

2. Means for measuring the magnitude and direction of deviation of a line of sight to a star from a line in space comprising means for scanning the area including said star with angularly progressive radial sweeps, and electronic means responsive to said scanning means for measuring the polar coordinates of said star in said area to thereby measure the magnitude and direction of deviation of a line of sight to said star from a line in space, said scanning means comprising an optical system for gathering light from said star, a reticle slotted from its center radially outward rotated about the optical axis of said system, and an opaque disc with uniformly spaced perforations about a circle thereon rotated about an axis displaced by the radius of said circle from said optical axis and disposed adjacent said reticle.

3. Optical scanning apparatus comprising an optical system for gathering light from a celestial body, an opaque disc having a single radial transparent slit rotatable about the optical axis of said system a second disc rotatable about an axis displaced from said optical axis a predetermined distance, said second disc having a plurality of holes evenly spaced about a circle drawn on the axis of rotation thereof and having a diameter equal to the displacement of said two axes of rotation, photoelectric means for generating electrical signals in response to light passing through both said discs from said optical system, and means for rotating said discs in synchronism to scan the entire field of said optical system with a radially moving point scan.

4. A device as recited in claim 3 and further comprising electronic means for measuring the time interval and phase between a reference and the output of said photoelectric means to thereby measure the magnitude and direction of the deviation of the line of sight to said celestial body from an optical axis of said system.

5. Means for measuring the direction of the deviation of the line of sight to a celestial body from an optical axis in space, comprising an optical system for gathering light from said body, an opaque disc having a single radial transparent slit rotatable about the optical axis of said system, a second disc rotatable about an axis displaced from said optical axis a predetermined distance, said second disc having a plurality of holes evenly spaced about a circle drawn on the axis of rotation thereof and having a diameter equal to the displacement of said two axes of rotation, photoelectric means for generating electrical signals in response to light passing through both said discs from said optical system, means for rotating said discs in synchronism to scan the entire field of said optical system with a radially moving point scan, tachometer means for producing square waves of period corresponding to the time required to scan the entire field of said optical system once, and electronic means responsive to said photoelectric means and said tachometer means for producing alternating current signals which are the sine and cosine functions of the angular position of said celestial body in the field of said optical system.

References Cited in the file of this patent

UNITED STATES PATENTS

| | | |
|---|---|---|
| 2,369,622 | Toulon | Feb. 13, 1945 |
| 2,371,963 | La Pierre | Mar. 20, 1945 |
| 2,432,123 | Potter | Dec. 9, 1947 |
| 2,439,392 | Jones | Apr. 13, 1948 |
| 2,462,925 | Varian | Mar. 1, 1949 |
| 2,476,985 | Levy | July 26, 1949 |
| 2,499,941 | Benfer | Mar. 7, 1950 |
| 2,513,367 | Scott | July 4, 1950 |
| 2,606,229 | Brewer et al. | Aug. 5, 1952 |
| 2,713,134 | Eckweiler | July 12, 1955 |

FOREIGN PATENTS

| | | |
|---|---|---|
| 10,273 | Australia | Nov. 7, 1928 |